No. 620,518. Patented Feb. 28, 1899.
C. W. VAUGHAN.
METALLIC PIPE CONNECTION FOR TRAIN PIPES.
(Application filed Apr. 20, 1898.)

(No Model.) 2 Sheets—Sheet 1.

No. 620,518. Patented Feb. 28, 1899.
C. W. VAUGHAN.
METALLIC PIPE CONNECTION FOR TRAIN PIPES.
(Application filed Apr. 20, 1898.)
(No Model.) 2 Sheets—Sheet 2.

Witnesses
Inventor
Charles W. Vaughan
By Attys.

UNITED STATES PATENT OFFICE.

CHARLES W. VAUGHAN, OF HILLSDALE, MICHIGAN, ASSIGNOR OF ONE-FOURTH TO JOHN R. SUTTON, OF SAME PLACE.

METALLIC PIPE CONNECTION FOR TRAIN-PIPES.

SPECIFICATION forming part of Letters Patent No. 620,518, dated February 28, 1899.

Application filed April 20, 1898. Serial No. 678,238. (No model.)

*To all whom it may concern:*

Be it known that I, CHARLES W. VAUGHAN, a citizen of the United States, residing at Hillsdale, in the county of Hillsdale and State of Michigan, have invented certain new and useful Improvements in Metallic Pipe Connections for Train-Pipes, of which the following is a specification, reference being had therein to the accompanying drawings.

The invention consists in the construction of a metallic pipe-section adapted to be coupled to a like section or to a dummy coupler on the same car, the same being connected to the train-pipe to permit a horizontal swinging motion and having intermediate joints which permit up-and-down and approaching-and-receding movements, the section having means for permitting a rotary movement of the coupler about its axis.

The invention further consists in the construction, arrangement, and combination of the various parts, as more fully hereinafter described and claimed.

Figure 1:
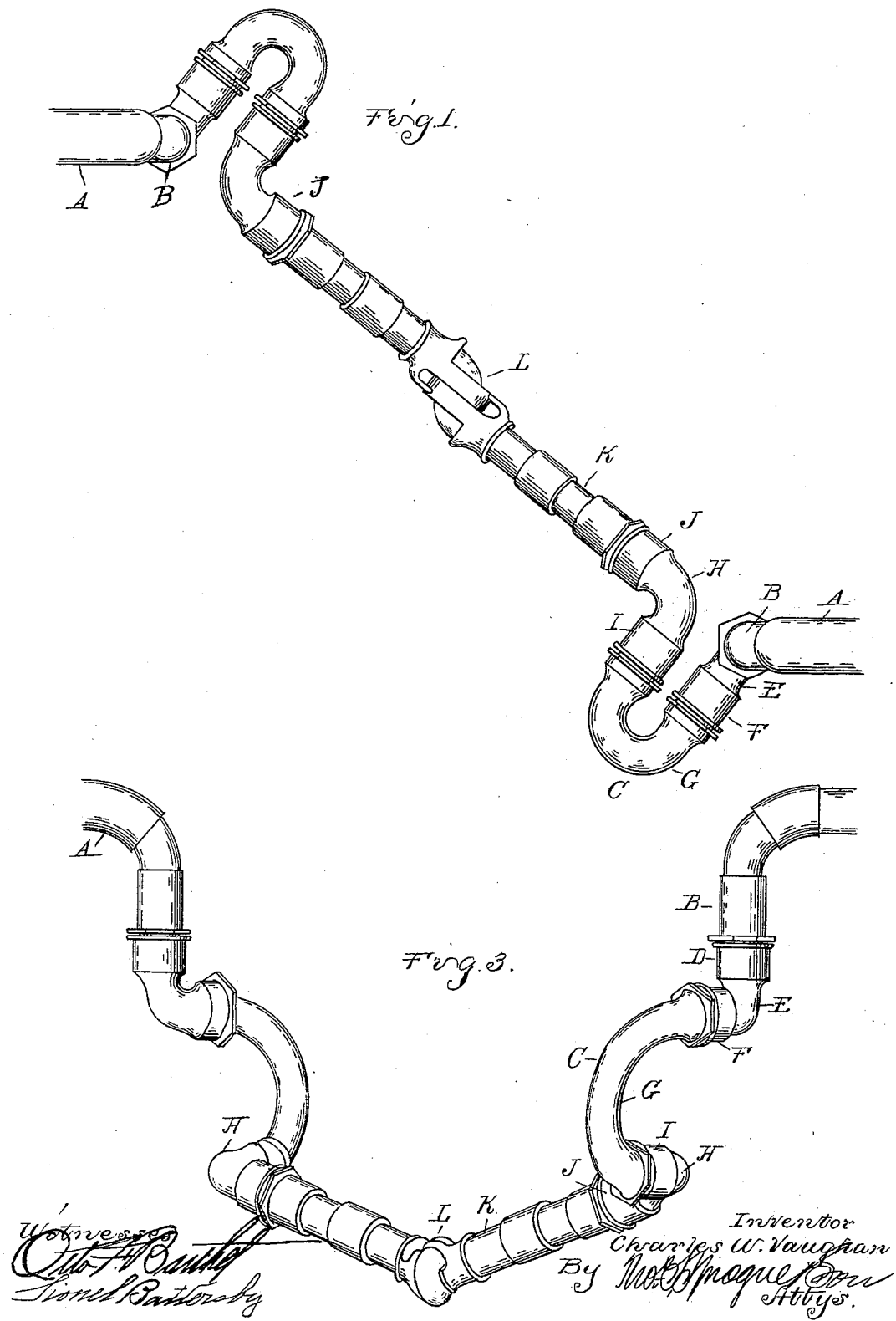
Figure 2:
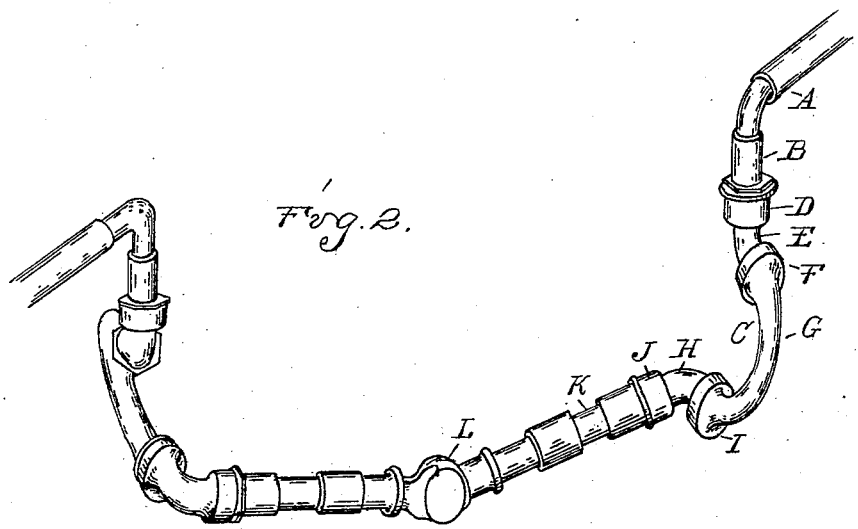
Figure 4:
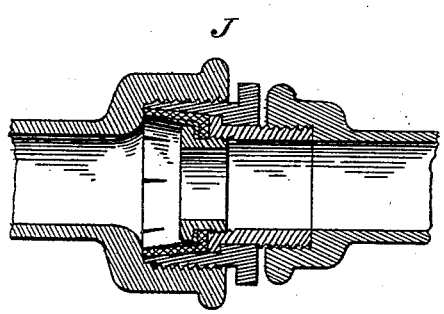

In the drawings, Figure 1 is a top plan view of my improved coupler-section, showing a pair of them coupled together as in use on an air-brake pipe of a railway-car. Fig. 2 is a perspective view thereof. Fig. 3 is a side elevation thereof. Fig. 4 is a longitudinal section through one of the swivel-joints.

In the manufacture of a metallic connection for train-pipes I find that it is necessary to first make the passage-way as nearly direct as possible and to provide for taking up the strains to which the device is subjected in use. To do this, I find that three things are required—first, that the section proper shall be connected to the train-pipe by in effect a vertical swivel, permitting the section as a whole to be turned around that swivel in a substantially horizontal plane; second, that the connection shall have joints between this vertical swivel and the coupler which permit the taking up of the to-and-fro movements and the up-and-down movements of the cars in relation to each other, and, third, that to the outer end of the section there shall be attached a proper coupler or coupling member by which the connection may be coupled to a similar connecting-pipe on an adjoining car and that the connection shall embody means which permit this coupler on the end of the section to be freely turned about its axis, so that the meeting faces of the two couplers in the middle may be brought into the exact parallel relation required for a tight joint. This joint, which permits the torsional movement of the coupler, will also take up any torsional movement between the ends of the cars. My coupling-section comprises these three features, and I have shown them in the accompanying drawings of the following construction:

A represents the ends of two train-pipes of adjoining cars. These train-pipes are provided at their ends with suitable nipples or elbows to connect with the vertical section B, and to which is swiveled my connecting-section, which as a whole I will letter C, D being the vertical swivel-joint referred to. It is evident that with this vertical swivel-joint the section may be turned in a substantially horizontal plane at any desired angle to the train-pipe. In this case I have shown a swivel formed in one end of an elbow E, the other end having a swivel-joint F therein, to which is connected the return-bend G. The other end of this return-bend has an oppositely-arranged elbow H swiveled thereto by the swivel-joint I. The other end of the elbow H is provided with a swivel connection or joint J, to which is connected the coupler-section K, this coupler-section carrying at its end the coupler L. The parts being as thus described, they will hang substantially as shown in Fig. 2 in use when two such sections are coupled together, and by an examination of that figure it will be seen that the coupler may be turned in a horizontal plane at any desired angle to the train-pipe by turning about the swivel D, that forward-and-back and up-and-down motions of the coupler will be taken care of by the swivel-joints F and I, and that the torsional movements of the cars are taken up and the alining of the couplers is permitted by the swivel J. When the two sections are disconnected, it is the practice with hose-pipe to hang them up to a dummy coupler on the under side of the car-platform at one side of the line of the train-pipe, and with this construction the perfect flexibility given by the joints enables this to be done just as readily as with the hose-pipe itself.

It will be observed that my section is made up of, in effect, four pieces—two elbows and return-bends and a coupler pipe or section—and that all the bends are easy curves, which do not materially impede the flow of the fluid therethrough.

While I consider this a desirable construction, I do not limit myself to it, as I believe the scope of my invention as expressed in the claims may include other structures with similarly-disposed joints.

I have shown the swivel in the coupler-section as at J; but it is evident that it may be at any other point which will permit the torsional movement of the coupler-section both to alining the meeting faces of the couplers themselves and to take up the torsional movement of the cars in relation to each other.

The swivel-joint which I have shown in section in Fig. 4 is a union-joint with a packing therein and forms no part of my present invention, and therefore I do not deem it necessary to describe its detail construction further than is shown in the drawings, and I have made it the subject-matter of another pending application, Serial No. 674,892, filed March 23, 1898.

What I claim as my invention is—

1. A metallic pipe connection consisting of two like sections connected to the train-pipes to permit a horizontal swinging motion, each section comprising intermediate joints which permit the up-and-down and approaching-and-receding movement of the cars, and a coupler permanently connected to the outer end, with means for permitting the coupler to have a rotary movement around its axis.

2. A metallic pipe connection comprising a coupler-carrying section, a swivel therein permitting a rotary movement of the coupler, which is permanently secured thereto, a section connected by a vertical swivel to the train-pipe and a link connected at its ends to the section which is swiveled to the train-pipe and to the coupler-sections by cross-swivel joints.

3. The combination with the train-pipe having the downwardly-extending end, of an elbow swiveled thereon, a return-bend having a swiveled connection with said elbow, a second elbow swiveled to the outer end of the return-bend and a pipe bearing a coupler at its end, swiveled to the outer end of the last-mentioned elbow.

4. A metallic pipe connection, connected to the train-pipe by a vertical swivel, to permit a horizontal swinging motion, an elbow having one end connecting to said swivel and its other end opening out laterally, a return-bend connecting by a swivel directly to said elbow, an oppositely-arranged elbow swiveled to the other end of the return-bend, a pipe-section swiveled to the end of said second elbow, and a "gravity locking-coupler" on the end of said pipe-section.

In testimony whereof I affix my signature in presence of two witnesses.

CHARLES W. VAUGHAN.

Witnesses:
M. B. O'DOGHERTY,
OTTO F. BARTHEL.